United States Patent
Olenoski et al.

(10) Patent No.: US 11,783,272 B2
(45) Date of Patent: Oct. 10, 2023

(54) SYSTEMS FOR IMPLEMENTING A PERMISSION-BASED AUTOMATIC UPDATE OF PHYSICAL ADDRESSES IN A DATABASE AND METHODS OF USE THEREOF

(71) Applicant: Capital One Services, LLC, McLean, VA (US)

(72) Inventors: Michelle S. Olenoski, Washington, DC (US); Michael Mossoba, Great Falls, VA (US); Latika Gulati, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 165 days.

(21) Appl. No.: 17/382,564

(22) Filed: Jul. 22, 2021

(65) Prior Publication Data

US 2023/0021849 A1    Jan. 26, 2023

(51) Int. Cl.
| | | |
|---|---|---|
| *G06Q 10/083* | (2023.01) | |
| *G06F 16/958* | (2019.01) | |
| *G06N 20/00* | (2019.01) | |
| *G06Q 10/10* | (2023.01) | |

(52) U.S. Cl.
CPC ......... *G06Q 10/083* (2013.01); *G06F 16/958* (2019.01); *G06N 20/00* (2019.01); *G06Q 10/10* (2013.01)

(58) Field of Classification Search
CPC .... G06Q 10/083; G06Q 10/10; G06F 16/958; G06N 20/00
USPC ........................................................ 705/330
See application file for complete search history.

(56) References Cited

U.S. PATENT DOCUMENTS

| | | |
|---|---|---|
| 6,189,026 B1 | 2/2001 | Birrell et al. |
| 8,370,482 B2 | 2/2013 | Shustef |
| 2007/0061719 A1 | 3/2007 | Law |
| 2015/0046365 A1* | 2/2015 | Zamer ............... G06Q 10/0838 |
| | | 705/341 |

(Continued)

OTHER PUBLICATIONS

"FlexPool: A Distributed Model-Free Deep Reinforcement Learning Algorithm for Joint Passengers and Goods Transportation" Published by IEEE (Year: 2021).*

*Primary Examiner* — Zeina Elchanti
(74) *Attorney, Agent, or Firm* — Greenberg Traurig, LLP

(57) ABSTRACT

A method utilizing a permission-based access functionality to obtain communication identifying metadata in electronic communications associated with a first and/or a second user. The communication identifying metadata is processed to generate first physical address metadata associated with the second user. Second physical addresses metadata associated with the second user is identified in data objects stored in electronic resources. The first and the second physical addresses metadata are inputted into a machine learning model which identifies related physical addresses, based on a change in a feature of the first and/or second physical addresses metadata and to predict a most likely current physical address of the second user. Upon receipt of the access permission to the current physical address of the second user, a database stored on a computing device of the first user is updated with the current physical address of the second user.

20 Claims, 13 Drawing Sheets

(56) References Cited

U.S. PATENT DOCUMENTS

2018/0260880 A1\* 9/2018 Halbrook ........... G06Q 10/0838
2019/0172007 A1\* 6/2019 Friedman ........... G06Q 10/0833

\* cited by examiner

20 → First User : David Stone
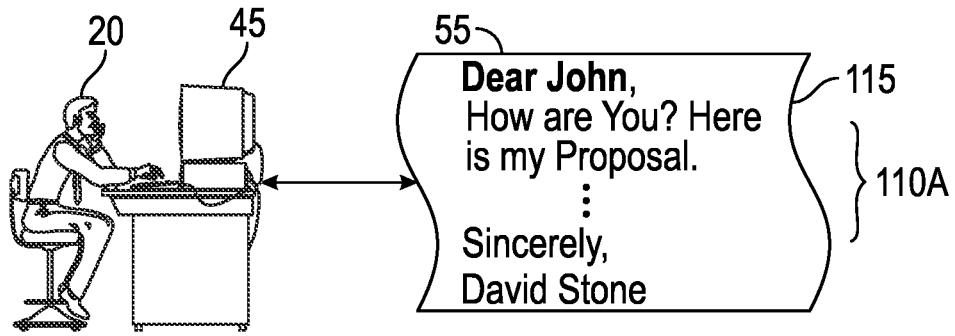
FIG. 3A
25 → Second User : John Smith
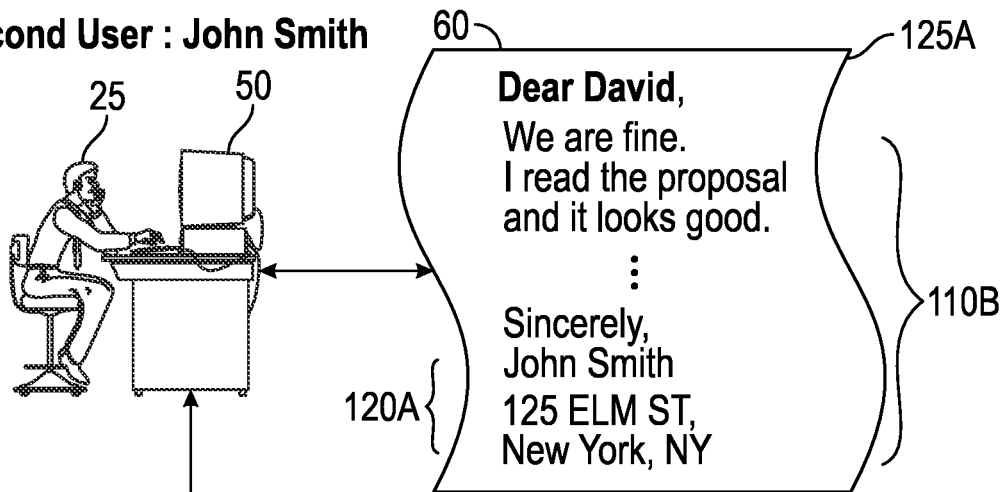
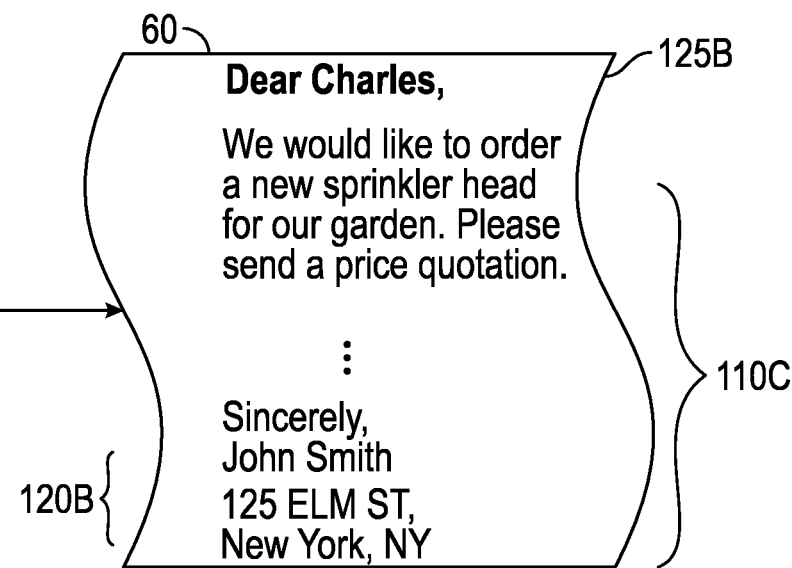
FIG. 3B

200 ⤹
55 ⤹

Order Form
Case of White Wine $157.33
Gift Card: Happy Birthday, My Old Friend
Enclosed Name of Recipent   John Smith ⤴ 25

Do You Want to Update Your Address
Book For John Smith                    Yes ▽  — 205
                                        No

Order Form
Case of White Wine $157.33

Name of Recipient:  John Smith  — 215

Do You Want to Use The Most Up-to-Date
Address of John Smith?

Yes ▽  — 217
                                        No

Order Form-Confirmation

Case of White Wine $157.33

Recipient:  John Smith
            125 Elm Street  ⎬ — 225
            New York, NY

FIG. 4C

SYSTEMS FOR IMPLEMENTING A PERMISSION-BASED AUTOMATIC UPDATE OF PHYSICAL ADDRESSES IN A DATABASE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based systems, and more particularly to systems for implementing a permission-based automatic update of physical addresses in a database and methods of use thereof.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of utilizing, by at least one processor, a permission-based access functionality to access over a communication network, a communication software application associated with a first user, a second user, or both. Communication identifying metadata for a plurality of electronic communications associated with the first user, the second user, or both may be obtained over the communication network via the permission-based access functionality, from the communication software application. The communication identifying metadata may be processed to generate first physical addresses metadata associated with the plurality of electronic communications. Second physical addresses metadata associated with the second user may be identified over the communication network, in a plurality of data objects stored in a plurality of electronic resources. The first physical addresses metadata and the second physical addresses metadata may be stored in a database. The first physical addresses metadata and the second physical addresses metadata may be inputted into at least one machine learning model configured to identify a plurality of related physical addresses, based on at least one change in at least one feature of the first physical addresses metadata, the second physical addresses metadata, or both, and to predict a most likely current physical address associated with the second user, where the at least one feature may include (i) occurrence and/or frequency of addresses in the database, (ii) different address usage types, and (iii) timing and/or durations information of address usage. An instruction may be transmitted over the communication network to display on a computing device associated with the first user, a first graphical user interface (first GUI) to the first user, the first GUI comprising at least one first GUI element enabling the first user to launch a permission request to the second user, requesting a permission to access a current physical address of the second user. The permission request may be received over the communication network. An instruction may be transmitted over the communication network, in response to the permission request, to display on a computing device associated with the second user, a second graphical user interface (second GUI) to allow the second user to allow or deny an access to the current physical address of the second user to the first user. The permission request to the most likely current physical address associated with the second user may be transmitted over the communication network. A permission for the first user for access to the current physical address of the second user may be received over the communication network. Upon receipt of the permission for access to the current physical address of the second user, automatically updating over the communication network, a database of physical addresses stored on a computing device associated with the first user with the current physical address of the second user for at least one future communication with the second user.

In some embodiments, the present disclosure provides an exemplary technically improved computer-based server that includes at least the following components of at least one non-transitory memory and at least one processor. The at least one processor may be configured to execute a code that is stored in the at least one non-transitory memory that causes the at least one processor to utilize a permission-based access functionality to access over a communication network, a communication software application associated with a first user, a second user, or both, to obtain, over the communication network via the permission-based access functionality, from the communication software application, communication identifying metadata for a plurality of electronic communications associated with the first user, the second user, or both, to process the communication identifying metadata to generate first physical addresses metadata associated with the plurality of electronic communications, to identify, over the communication network, in a plurality of data objects stored in a plurality of electronic resources, second physical addresses metadata associated with the second user, to store the first physical addresses metadata and the second physical addresses metadata in a database, to input the first physical addresses metadata and the second physical addresses metadata into at least one machine learning model configured to identify a plurality of related physical addresses, based on at least one change in at least one feature of the first physical addresses metadata, the second physical addresses metadata, or both, and to predict a most likely current physical address associated with the second user where the at least one feature may include (i) occurrence and/or frequency of addresses in the database, (ii) different address usage types, and (iii) timing and/or durations information of address usage, to transmit over the communication network, an instruction to display on a computing device associated with the first user, a first graphical user interface (first GUI) to the first user, the first GUI comprising at least one first GUI element enabling the first user to launch a permission request to the second user, requesting a permission to access a current physical address of the second user, to receive over the communication network, the permission request, to transmit over the communication network, in response to the permission request, an instruction to display on a computing device associated with the second user, a second graphical user interface (second GUI) to allow the second user to allow or deny an access to the current physical address of the second user to the first user, to transmit over the communication network, the permission request to the most likely current physical address associated with the second user, to receive over the communication network, for the first user, a permission for access to the current physical address of the second user, and to automatically update over the communication network, upon receipt of the permission for access to the current physical address of the second user, a database of physical addresses stored on a computing device associated with the first user with the current physical address of the second user for at least one future communication with the second user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 3A-3E are exemplary graphical user interface screenshots on computing devices of a first user and a second user showing first physical addresses metadata and second physical addresses metadata in accordance with one or more embodiments of the present disclosure;

FIGS. 4A-4C are exemplary graphical user interface screenshots on a computing device of a first user as the first user creates an online order to send items to a second user in accordance with one or more embodiments of the present disclosure;

DETAILED DESCRIPTION

Figure 1:
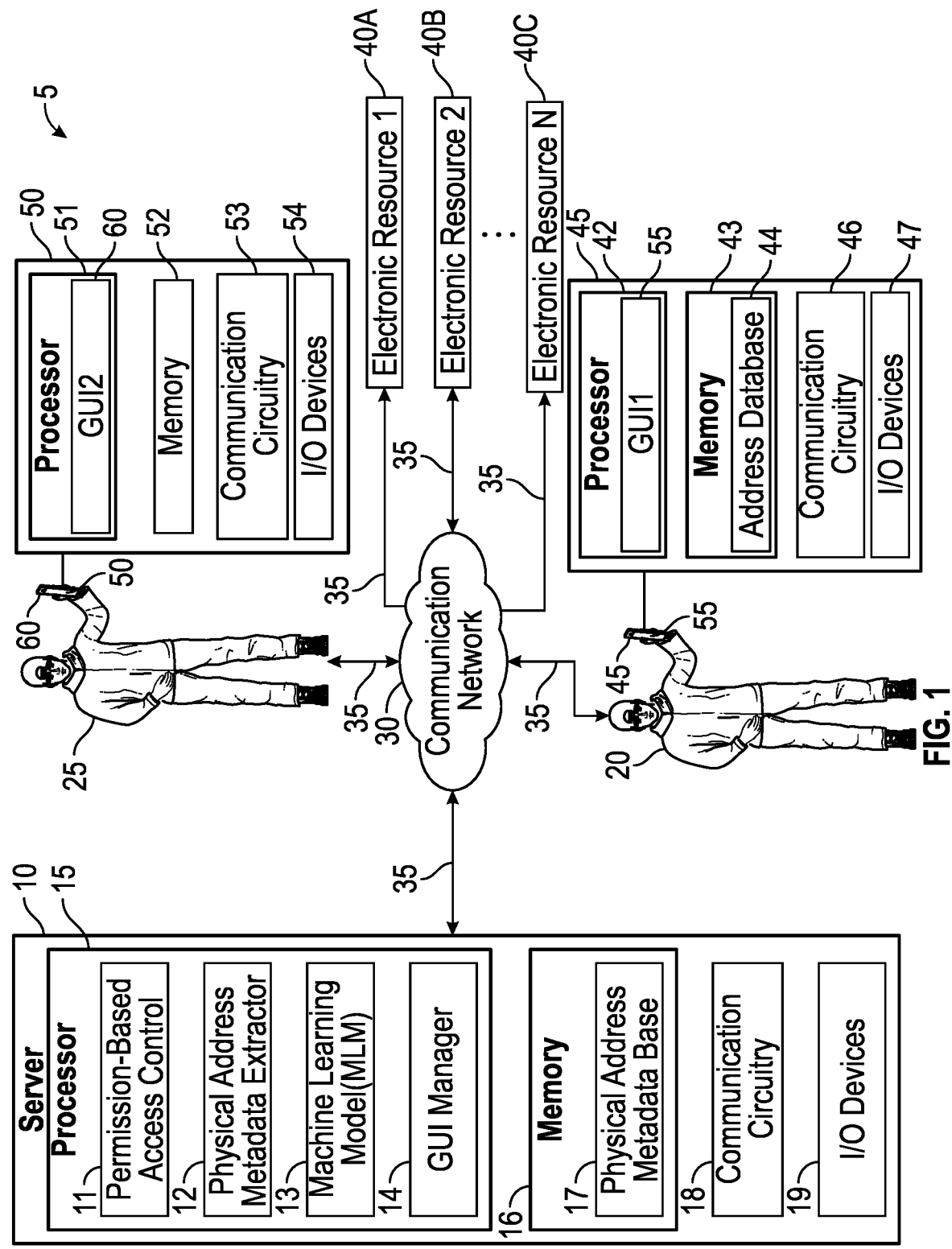
FIG. 1 is a block diagram of a system for implementing a permission-based automatic update of physical addresses in a database in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

A first user of a computing device may need a physical address to send an item to a second user, or to meet the second user, for example. The first user may have a physical address of the second user in a database stored on a computing device such as a laptop or smartphone, for example. However, the first user may not be sure that the physical address of the second user is correct, e.g., the physical address may be outdated. Furthermore, the first user may not even be aware that the second user may have recently changed physical addresses.

Embodiments of the present disclosure herein describe systems for implementing a permission-based automatic update of physical addresses in a database and methods of use thereof. A server may be configured to have permission-based access for monitoring communication identifying metadata in data objects related to the first user and/or second user generated by a communication software application for extracting first physical addresses metadata related to the second user from the communication identifying metadata.

In some embodiments, second physical addresses metadata may be identified in data objects related to the second user that are stored in a plurality of electronic resources (e.g., databases in medical records, businesses, and like, that may store the physical address of the second user). The first physical addresses metadata and the second physical addresses metadata may be inputted to a machine learning model that may be configured to identify a plurality of related physical addressed of the second user and to predict a most likely current physical address, which may be updated in the address database of the first user after receiving permission from the second user.

FIG. 1 is a block diagram of a system 5 for implementing a permission-based automatic update of physical addresses in a database in accordance with one or more embodiments of the present disclosure. The system 5 may include a server 10, a computing device 45 associated with a first user 20, a computing device 50 associated with a second user 25, and a plurality of N electronic resources 40A, 40B, and 40C all communicating 35 over a communication network 30 where N is an integer. The plurality of N electronic resources 40A, 40B, and 40C may be denoted as ELECTRONIC RESOURCE1 40A, ELECTRONIC RESOURCE2 40B, . . . , ELECTRONIC RESOURCEN 40C.

In some embodiments, the electronic resources may store databases with data objects that may have physical addresses metadata of the second user 25. For example, one electronic resource from the plurality of N electronic resources may include a database associated with a pharmacy, and the second user's address may be stored in a prescription data record on a prescription database. In another example, another electronic resource from the plurality of N electronic resources may include a database associated with an airlines or travel service, and the second user's address may be stored in a reservation data record in a reservation database.

In some embodiments, the server 10 may include a processor 15, a memory 16, a communication circuitry 18 for communicating 35 over the communication network 30, and input and/or output (I/O) devices 19 such as a keyboard, a mouse, a touchscreen, and/or a display, for example.

In some embodiments, the memory 16 may store a physical addresses metadata database 17 (e.g., a first physical addresses metadata database and/or a second physical addresses metadata database). The database 17 may also store the physical addresses of a particular user extracted from the physical addresses metadata.

In some embodiments, the processor 15 may be configured to execute software modules such as a permission-based access control 11 module, a physical address metadata extractor 12 module, a machine learning model (MLM) 13 module, and/or a graphical user interface (GUI) manager 14 module.

In some embodiments, the permission-based access control 11 module may provide permission-based access functionality for the server 10 to obtain access over the communication network 30 to data objects such as communication-based data objects (e.g., e-mails) of the first user 20 and/or the second user 25 stored on their respective computing devices and/or in one or more electronic resources 40A, 40B, 40C.

In some embodiments, the permission-based access control 11 module may provide permission-based access functionality for the server 10 to obtain access over the communication network 30 to data objects such as communication-based data objects (e.g., e-mails) of the first user 20 using OAuth, a browser extension, and/or manual input.

In some embodiments, the physical address metadata extractor 12 module may be used to identify physical addresses metadata in the data objects stored in any of the plurality of electronic resources.

In the context of this disclosure, the term "first physical addresses metadata" may refer to metadata extracted from communication identifying metadata such as the content of electronic mail (e-mail) data files stored for example on computing devices associated with the first user 20 and/or the second user 25. In contrast, the term "second physical addresses metadata" may refer to metadata extracted from any of a plurality of data objects stored in the plurality of electronic resources. The term physical addresses metadata may include both the first and the second physical addresses metadata. The first and the second physical addresses metadata may be stored in the server 10 in the physical addresses metadata database 17.

The machine learning model (MLM) 13 module may use the physical addresses metadata as an input and identify a plurality of related, or candidate, physical addresses of a particular user to predict (e.g., using a probability) that any of the plurality of the related physical address is a most likely current physical address associated with the particular user. The machine learning model (MLM) 13 may be any suitable neural network model for performing the functions described herein.

In some embodiments, the computing device 45 associated with the first user 20 may include a processor 42, a first graphical user interface (GUI1) 55 displayed on a display of the computing device 45, a memory 43 with an address database 44 (e.g., the first user's electronic address book), a communication circuitry 46 for communicating 35 over the communication network, and I/O devices 47, such as a display and/or touchscreen, for example.

In some embodiments, the computing device 50 associated with the second user 25 may include a processor 51, a second graphical user interface (GUI2) 60 displayed on a display of the computing device 50, a memory 52, a communication circuitry 53 for communicating 35 over the communication network, and I/O devices 54, such as a display and/or touchscreen, for example.

In some embodiments, the permission-based access control 11 module may execute an application programming interface (API) call with any of the plurality of electronic resources to obtain the physical addresses metadata in the data objects with information related to a particular user. A data object may be a data table, a data array, a data pointer, a data record, a data file, a data set, and/or scalar types stored in any of the electronic resources.

In some embodiments, the server 10 may be associated with a financial institution. In this case, the server 10 may store a database of payment card users and/or bank account owners and/or their transaction data, all of which may include physical addresses metadata of a particular user.

The embodiments described herein provide a technical solution for automatically extracting current physical addresses of a second user from a variety of data sources for automatically updating an address book of a first user. System 5 may identify physical addresses metadata from many different database sources such as via communication software application and/or data objects stored in a plurality of electronic resources associated with any suitable business, entity, and/or financial institution.

In some embodiments, the machine learning model (MLM) 13 may be trained to process the physical addresses metadata inputted to the MLM so as to identify current physical addresses and to predict the likelihood that each of the identified physical addresses is the most likely current physical address. For example, The MLM 13 may compute a probability that a particular current address is the most likely current physical address using features in the physical addresses metadata as will be discussed later. The most likely current physical address may be identified from a plurality of related physical address when the probability is greater than a predefined threshold.

Furthermore, in some embodiments, before transmitting the most likely current physical address to the first user, the second user may be requested to provide permission via the GUI2 60 for example on the computing device 50 of the second user 25 so as to provide control for the second user 25 over the personal identifiable information of the second user as shown in the next figures herein below.

Note that for the examples shown below, the first user 20 may have a name 20N as David Stone. The second user 25 may have a name 25N as John Smith. The second user 25 may reside at a current physical address 25A of 125 Elm Street, New York, N.Y.

Figure 2A:
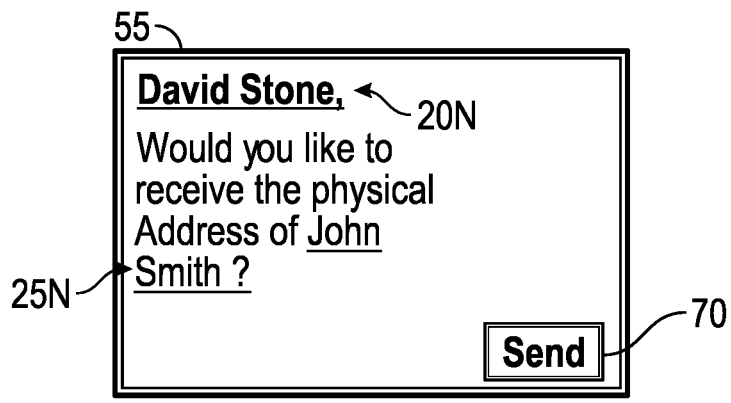
FIGS. 2A-2E are exemplary graphical user interface screenshots on computing devices of a first user and a second user in accordance with one or more embodiments of the present disclosure.

FIGS. 2A-2E are exemplary graphical user interface screenshots on computing devices of a first user and a second user in accordance with one or more embodiments of the present disclosure. As shown in FIG. 2A, the permission-based access control 11 module may trigger the GUI manager 14 to send instructions over the communication network 30 to display on the GUI1 55 a message asking the first user 20, David Stone, if he wants to receive the physical address of the second user 25, John Smith. The GUI1 55 may include a "SEND" button 70 to allow the first user 20 to send a permission request to the permission-based access control 11 module.

Figure 2B:
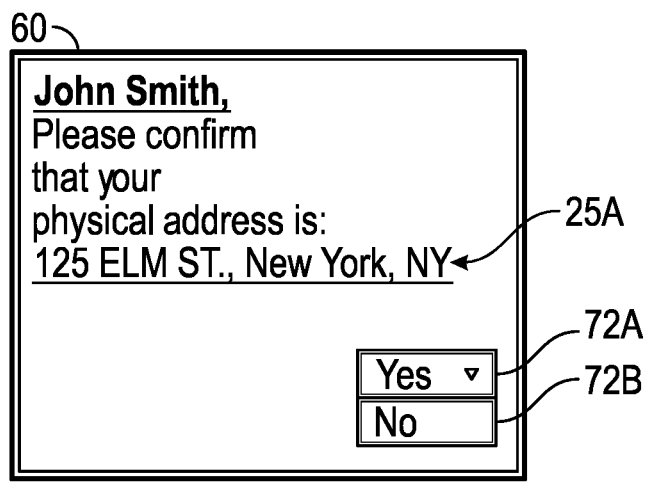

In some embodiments, as shown in FIG. 2B, the permission-based access control 11 module, in response to receiving the permission request, may trigger the GUI manager 14 to send instructions over the communication network 30 to display a confirmation message on the GUI2 60 associated with the second user. The computing device 50 associated with the second user may receive the most likely current physical address as determined by the MLM 13. The GUI2 60 may display the most likely current physical address 25A in a message request the second user John Smith to confirm this displayed physical address as his current physical address as 125 Elm Street, New York, N.Y.

The second user 25 may confirm "YES" 72A or "NO" 72B on the pull-down menu. If the second user 25 answers "YES" 72A, then the most likely current physical address of the second user may be flagged or marked in the physical address metadata database 17 as the current physical address of the second user 25. If the answer is "NO" 72B, the processor 15 may send another one of the related physical addresses extracted from the physical address metadata database 17.

Figure 2C:
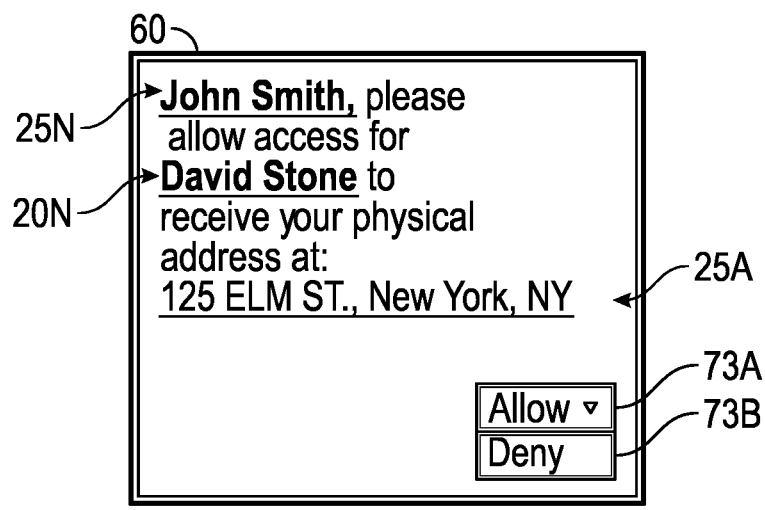

In some embodiments, as shown in FIG. 2C, the permission-based access control 11 module, in response to receiving the current physical address confirmation, may trigger the GUI manager 14 to send instructions over the communication network 30 to display a permission grant message on the GUI2 60 to the second user to allow access the first user to receive the current physical address of the second user 25. The second user 25 may allow or deny assess for the first user 20 by choosing "ALLOW" 73A or "DENY" 73B on the pull-down menu.

Figure 2D:
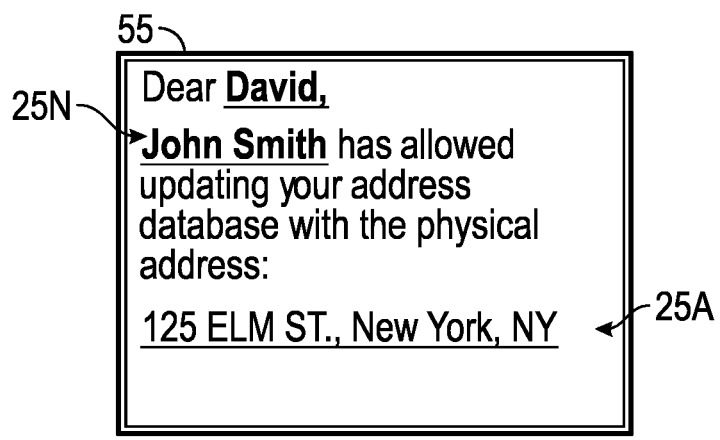

In some embodiments, if the second user chooses "ALLOW" 73A, as shown in FIG. 2D, the permission-based access control 11 module may trigger the GUI manager 14 to send instructions over the communication network 30 to display a permission grant notification on the GUI1 55 to the first user 20. The permission grant notification informs the first user 20, David Stone, that the second user 25, John Smith, has allowed the automatic update of the address database 44 of the first user 20.

Figure 2E:
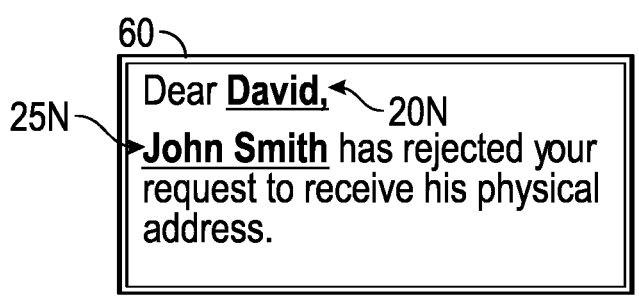

In some embodiments, if the second user chooses "DENY" 73B, as shown in FIG. 2E, the permission-based access control 11 module may trigger the GUI manager 14 to send instructions over the communication network 30 to display a permission rejection notification on the GUI1 55 to the first user 20. The permission rejection notification informs the first user 20, David Stone, that the second user 25, John Smith, has rejected his request relay his current physical address details to the first user 20.

In some embodiments, the second user 25 may set approval criteria such as for example, approval for anyone with a link to my address page, approval for anyone connected to me via Linkedin and/or Facebook, and/or approval for anyone with an email address (domain) from my school or employer, for example.

FIGS. 3A-3E are exemplary graphical user interface screenshots on computing devices of a first user and a second user showing first physical addresses metadata and second physical addresses metadata in accordance with one or more embodiments of the present disclosure.

FIG. 3A illustrates the first user 20 using the first user's computing device 45. Through the communication network 30, the permission-based access control 11 module may allow the processor 15 to monitor e-mail data objects of the first user 20 on the first user's computing device 45 over the communication network 30. Since the first user 20 may be interested in an automatic update of first user's address database 44, the processor 15 may identify a data object in the sent item box such as an e-mail 115 between the first user 20, David Stone, and the second user 25, John Smith sending, for example, where David sends John a proposal as shown in the communication identifying metadata 110A (e.g., the text body of the e-mail message).

FIG. 3B illustrates the second user 25 using the second user's computing device 50. Through the communication network 30, the permission-based access control 11 module may allow the processor 15 to monitor e-mail data objects of the second user 25 on the second user's computing device 50 over the communication network 30. The processor 15 may identify data objects such as e-mails 125A and 125B in the sent item box such as an e-mail 125A between the first user 20, David Stone, and the second user 25, John Smith sending, for example, where John confirms that the proposal (sent in e-mail 115) sent by David is good as shown in the communication identifying metadata 110B (e.g., the text body of the e-mail message). The physical address metadata extractor 12 module identifies physical address metadata 120A (e.g., 123 Elm Street, New York, N.Y.) in communication identifying metadata 110B.

In the second e-mail 125B, the second user 25 may communicate with a vendor for ordering a new sprinkler head for John's garden. The physical address metadata extractor 12 module identifies physical address metadata 120B (e.g., 123 Elm Street, New York, N.Y.) in communication identifying metadata 110C.

In some embodiments, the physical address metadata extractor 12 may store the first physical address metadata 120A, 120B in the physical address metadata database 17.

Figure 3C:
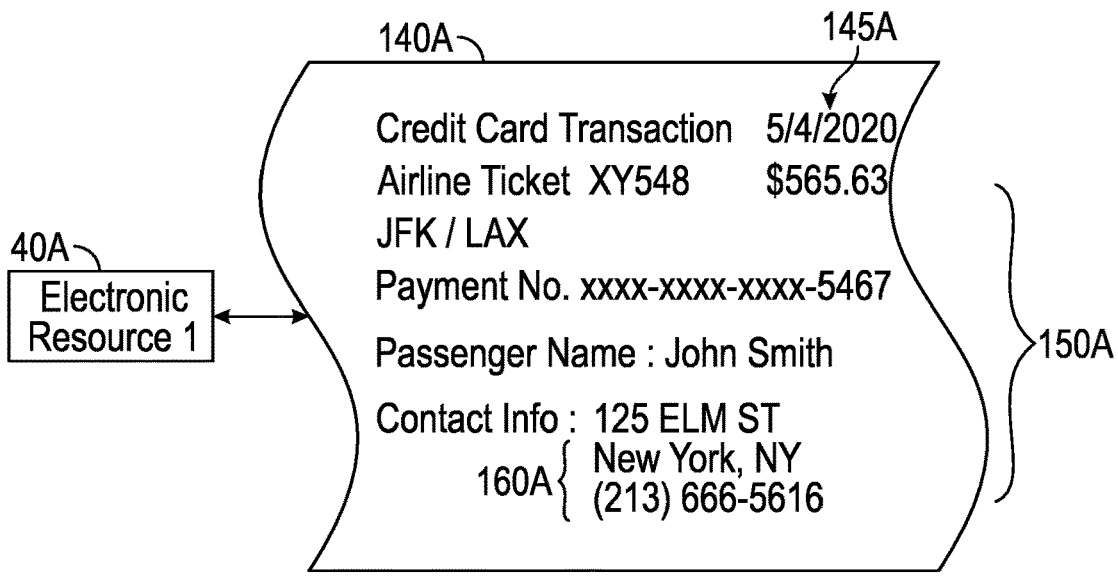
Figure 3D:
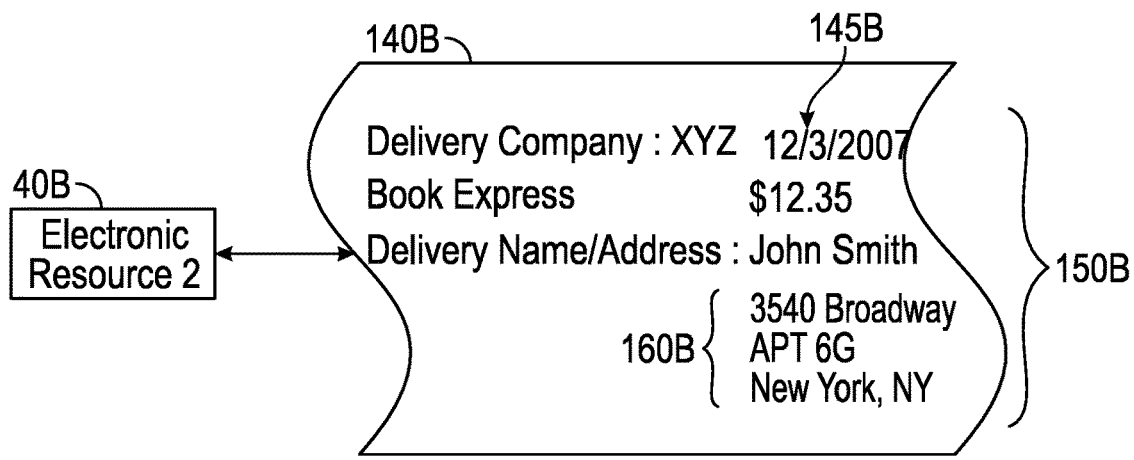
Figure 3E:
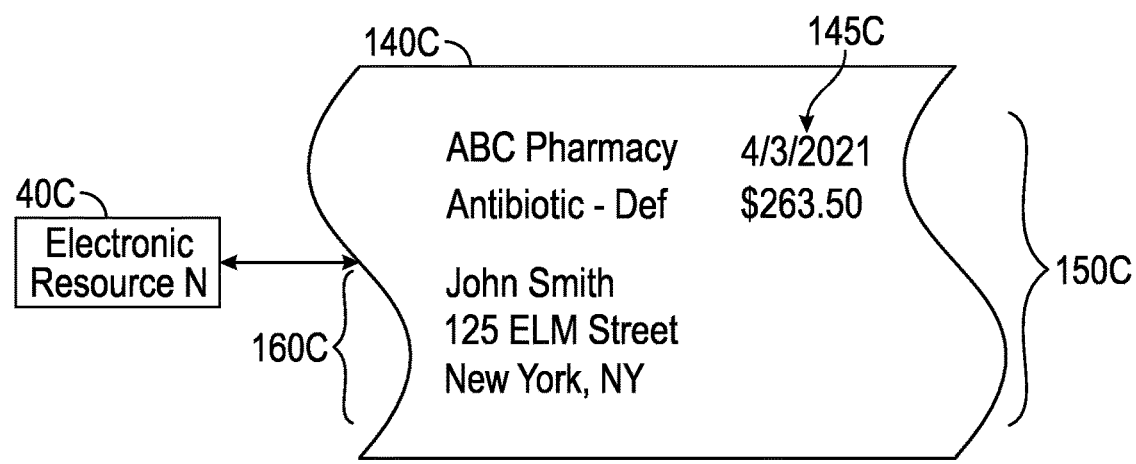

FIGS. 3C-3E illustrates processor 15 via permission-based access control 11 module querying data objects stored in databases respectively in three electronic resources 40A, 40B, and 40C. In some embodiments, permission-based access control 11 module may issue an API call to any of the plurality of N electronic resources to get the second physical address metadata.

As shown in FIG. 3C, a data object 140A may be a credit card transaction record with metadata 150A and a date 145A of May 4, 2020. The metadata 150A of the data object 140A may include second physical address metadata 160A showing a physical address of 125 Elm St., New York, N.Y.

As shown in FIG. 3D, a data object 140B may be a delivery record from Delivery Company XYZ with metadata 150B and a date 145B of Dec. 3, 2007. The metadata 150B of the data object 140B may include second physical address metadata 160B showing a physical address of 3540 Broadway, Apt. 6G, New York, N.Y.

As shown in FIG. 3E, a data object 140C may be a pharmacy purchase record with metadata 150C and a date 145C of Apr. 3, 2021. The metadata 150C of the data object 140C may include second physical address metadata 160C showing a physical address of 125 Elm St., New York, N.Y.

In some embodiments, the physical address metadata extractor 12 may store the second physical address metadata 160A, 160B and 160C in the physical address metadata database 17.

Figure 3F:
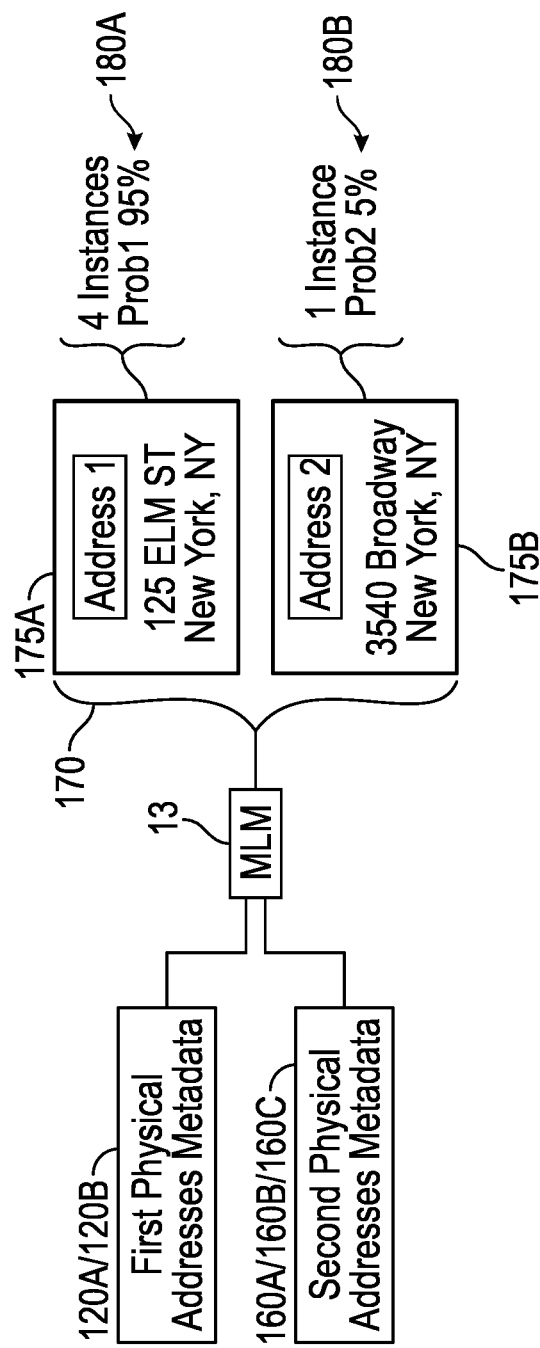
FIG. 3F is a block diagram of a machine learning model processing first physical addresses metadata and second physical addresses metadata in accordance with one or more embodiments of the present disclosure.

FIG. 3F is a block diagram of the machine learning model (MLM) 13 processing the first physical addresses metadata 120A and 120B and the second physical addresses 160A, 160B, and 160C metadata in accordance with one or more embodiments of the present disclosure. An output 170 of the MLM 13 may include a plurality of related physical addresses, in this case two addresses. A first outputted physical address 175A is identified as 125 Elm Street, New York, N.Y. with 4 instances found (e.g., in the examples of FIGS. 3A-3E). A probability 180A of the first outputted physical address 175A being the most likely current physical address is 95% as determined by the MLM 13

In some embodiments, the output 170 of the MLM 13 may include a second outputted physical address 175B is identified as 3540 Broadway, New York, N.Y. with 1 instance found (e.g., in the examples of FIGS. 3A-3E). A probability 180B of the second outputted physical address 175B being the most likely current physical address is 5% as determined by the MLM 13.

In some embodiments, the processor 15 may determine that any one of the outputted physical address, or any of the plurality of related physical addresses, may be the current physical address when the probability is greater than a predefined threshold such as 90%, for example. in other embodiments, the probability that any of the outputted physical addresses is the most likely current physical address may be based on the number of instances or occurrences or frequency of an address in the physical address metadata database 17.

In some embodiments, the machine learning model 13 may be configured to identify any of the plurality of related physical addresses, based on at least one change in at least one feature of the physical addresses metadata, and to predict a most likely current physical address associated with the second user, where the at least one feature may include (i) occurrence and/or frequency of addresses in the database, (ii) different address usage types, and (iii) timing and/or durations information of address usage. For example, data object 140B was dated with the date 145B as Dec. 3, 2007, which may be an indication that the physical address 175B of 3540 Broadway is an outdated physical address. Furthermore, there may be address usage types such as a primary address, a secondary address, a billing address, a delivery address, for example.

In some embodiments, the timing and/or durations information of address usage may be home versus work addresses, permanent versus temporary addresses, school addresses versus home addresses, for example. If the second user, for example, is a student, the physical address may be that of a dormitory address and/or a home address during vacation(s). The above referenced feature differences may be used by the machine learning model 13 to identify a probability of one of the plurality of related addresses is the current physical address of the second user.

In some embodiments, the processor 15 may search data objects for first physical addresses metadata and/or second physical addresses metadata of parents, siblings, and/or close relatives known to live with the second user 25 so as to determine the current physical address of the second user.

In some embodiments, when inputting the first physical addresses metadata, the second physical addresses metadata, or both into the machine learning model 13, the MLM 13 may be further configured to identify potential new physical address information including (i) different types of addresses, (ii) addresses having specified duration of time, (iii) marketing-related acquisition of the potential new physical address information, and (iv) a second user's usage of the potential new physical address information.

FIGS. 4A-4C are exemplary graphical user interface screenshots on the computing device 45 of the first user 20 as the first user 20 creates an online order form displayed on GUI1 55 to send items to the second user 25 in accordance with one or more embodiments of the present disclosure. In a first screenshot 200 as shown in FIG. 4A, the first user 20 wishes to send a case of white wine costing $157.33 as a birthday present to the second user 25, now the delivery recipient, John Smith 25. A pull-down menu 205 may ask the first user 20 if he would like to update his address book for the delivery recipient, John Smith (e.g., by using the embodiments disclosed herein).

In some embodiments, if the first user 20 answers "NO" on pull-down menu 205, the processor 42 may fetch the current physical address of John Smith stored in the address database 44 on the computing device 45 associated with the first user 20. However, if the first user answers "YES" on pull-down menu 205, the processor 15 may implement the flow of permission-based automatic update of physical addresses in the address database 44 as described herein, particularly in the permission-access flow shown in FIG. 2A-2E After the permission-access flow, the first user as shown in FIG. 4B in a second screenshot 210, the first user 20 may then be asked in a message 215 if he wants to use the most-up-to-date address of John Smith, the second user. If the first user 20 answer "YES" in a drop-down menu 217, the order form as shown in a third screenshot 220 in FIG. 4C is filled out with the most current physical address 225 as the recipient address and the order is automatically placed with the order form is sent out to the vendor.

In some embodiments, the processor 15 may utilize a browser extension application executed by the computing device 45 associated with the first user 20, to obtain at least one electronic communication, at least one metadata, at least one potential physical address information, or any combination thereof, of the second user 25.

In some embodiments, the browser extension application may be configured to automatically complete the current physical address, confidentially, into a check-out flow (e.g., the order form shown in FIGS. 4A-4C) involving need for a shipping address for a good or service, without providing the current physical address in a manner available to others over the communication network.

In some embodiments, the browser extension application may be configured to automatically complete the current physical address into a check-out flow (e.g., the order form) involving need for a shipping address for a good or service, upon entry or provision of a name of the second user who will receive the good or service.

In some embodiments, tokenized access may be provided where a merchant or a shipping company may access the physical address of the recipient (e.g., the second user) without the sender (e.g., the first user) doing so directly.

In some embodiments, the processor 15 may program to maintain updated address information of the second user 25 in both an actual address format and a tokenized format in the physical address metadata database 17 and/or the address database 44. The tokenized format may be configured for (i) provisioning to parties that do not need to know the current physical address of the second user 25, and/or (ii) provisioning to parties that have not been approved by the second user for receipt of the current physical address of the second user 25.

In some embodiments, the processor 15 may provide a feedback mechanism by which a recipient of the tokenized format may request that the second user 25 approve the recipient of the tokenized format to receive the current physical address of the second user 25 associated with the tokenized format.

In some embodiments, the processor 15 may provide over the communication network 30, to at least one computing device associated with at least one approved third party, the current physical address of the second user 25 only to the at least one approved third party involved with a physical shipment or delivery to the second user 25 at the current physical address.

Figure 5:
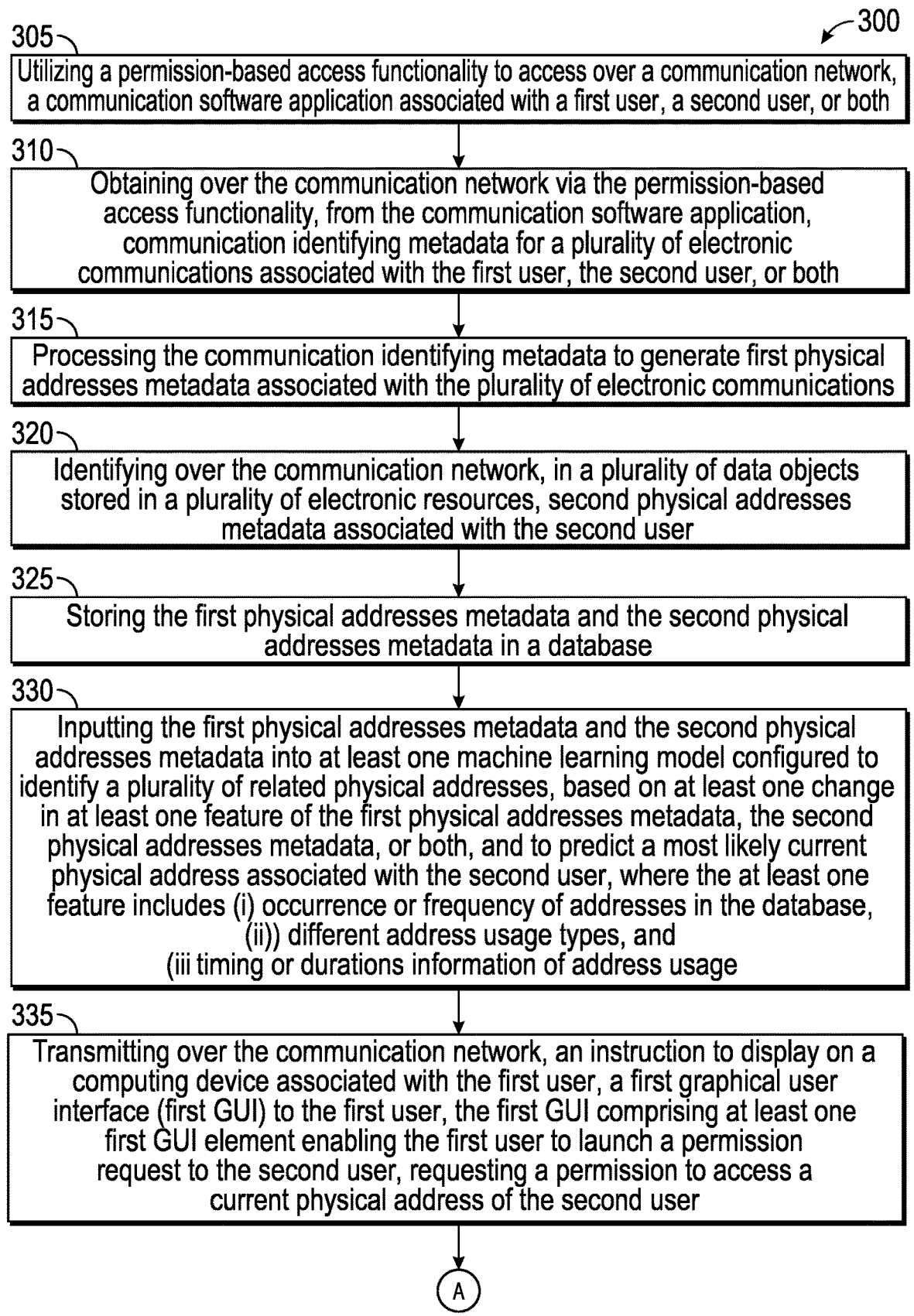
FIG. 5 is a flowchart of a method for implementing a permission-based automatic update of physical addresses in a database in accordance with one or more embodiments of the present disclosure.
Figure 5:
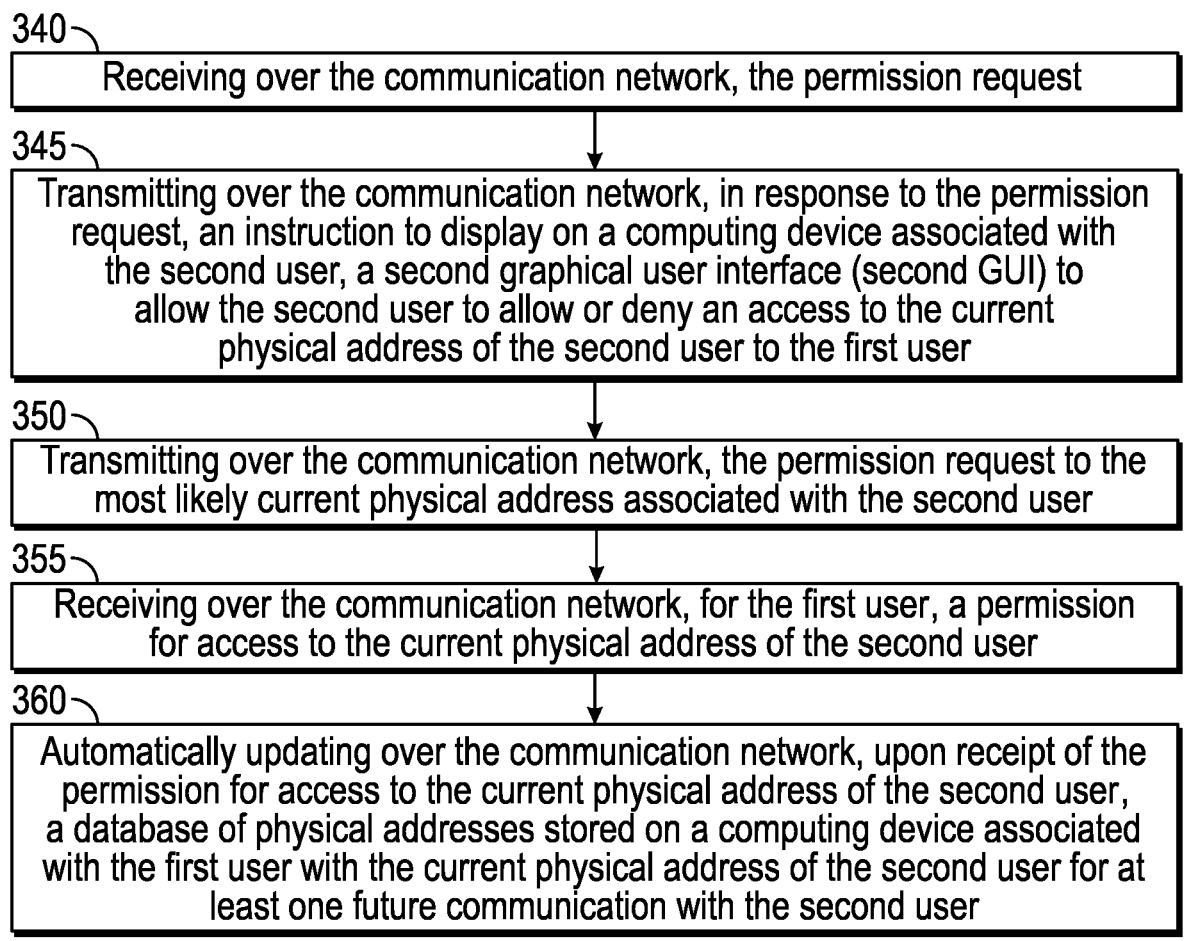

FIG. 5 illustrates a flowchart of a method 300 for implementing a permission-based automatic update of physical addresses in a database. in accordance with one or more embodiments of the present disclosure. Method 300 may be performed by the processor 15 of the server 10.

Method 300 may include utilizing 305 a permission-based access functionality to access over a communication network, a communication software application associated with a first user, a second user, or both.

Method 300 may include obtaining 310 over the communication network via the permission-based access functionality, from the communication software application, communication identifying metadata for a plurality of electronic communications associated with the first user, the second user, or both.

Method 300 may include processing 315 the communication identifying metadata to generate first physical addresses metadata associated with the plurality of electronic communications.

Method 300 may include identifying 320 over the communication network, in a plurality of data objects stored in a plurality of electronic resources, second physical addresses metadata associated with the second user.

Method 300 may include storing 325 the first physical addresses metadata and the second physical addresses metadata in a database.

Method 300 may include inputting 330 the first physical addresses metadata and the second physical addresses metadata into at least one machine learning model configured to identify a plurality of related physical addresses, based on at least one change in at least one feature of the first physical addresses metadata, the second physical addresses metadata, or both, and to predict a most likely current physical address associated with the second user, where the at least one feature includes (i) occurrence and/or frequency of addresses in the database, (ii) different address usage types, and (iii) timing and/or durations information of address usage.

Method 300 may include transmitting 335 over the communication network, an instruction to display on a computing device associated with the first user, a first graphical user interface (first GUI) to the first user, the first GUI comprising at least one first GUI element enabling the first user to launch a permission request to the second user, requesting a permission to access a current physical address of the second user.

Method 300 may include receiving 340 over the communication network, the permission request.

Method 300 may include transmitting 345 over the communication network, in response to the permission request, an instruction to display on a computing device associated with the second user, a second graphical user interface (second GUI) to allow the second user to allow or deny an access to the current physical address of the second user to the first user.

Method 300 may include transmitting 350 over the communication network, the permission request to the most likely current physical address associated with the second user.

Method 300 may include receiving 355 over the communication network, for the first user, a permission for access to the current physical address of the second user.

Method 300 may include automatically updating 360 over the communication network, upon receipt of the permission for access to the current physical address of the second user, a database of physical addresses stored on a computing device associated with the first user with the current physical address of the second user for at least one future communication with the second user.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users and/or transactions that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

As used herein, the term "mobile electronic device," or the like, such as computing devices 45 and 60, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/ public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
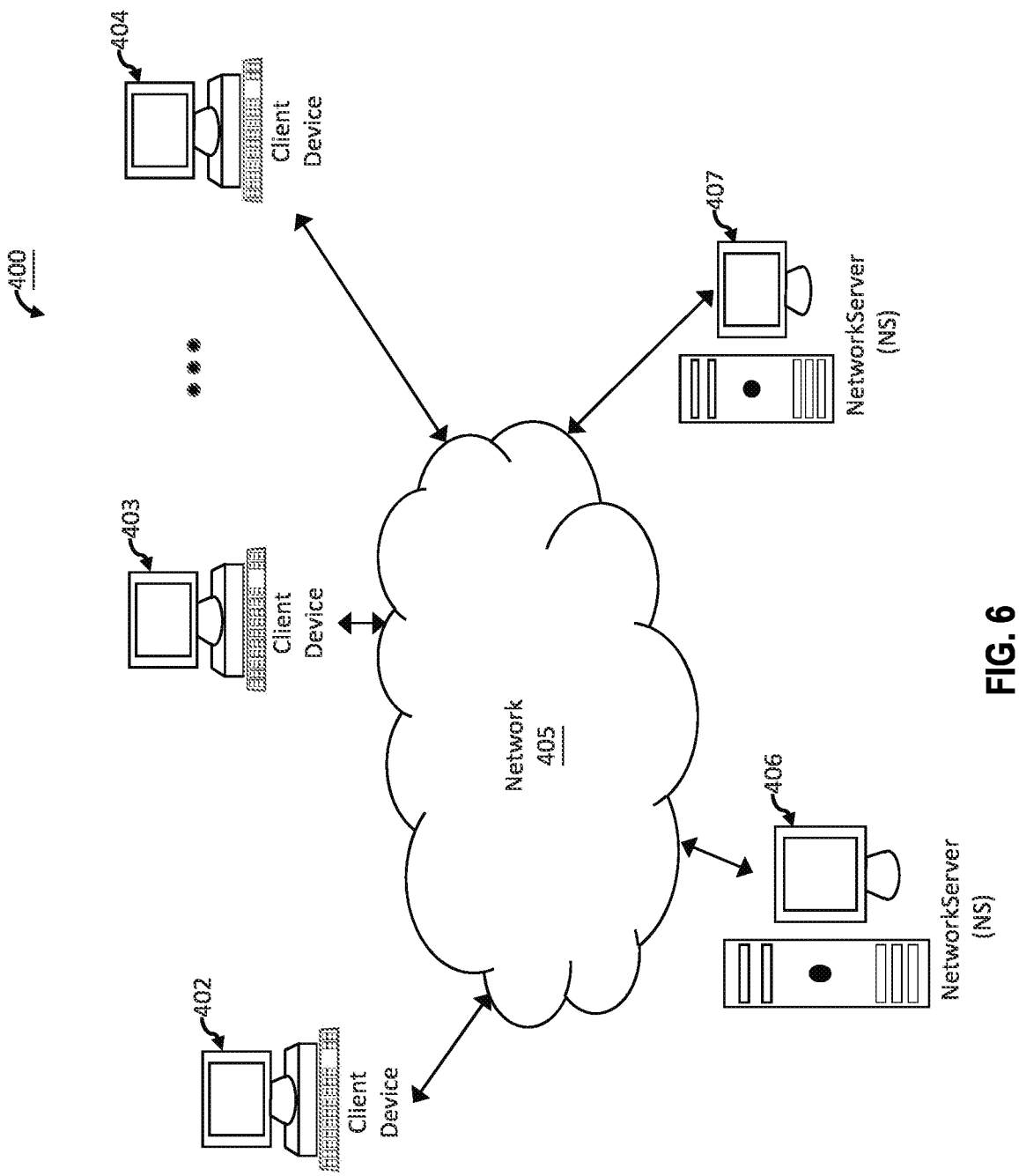
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
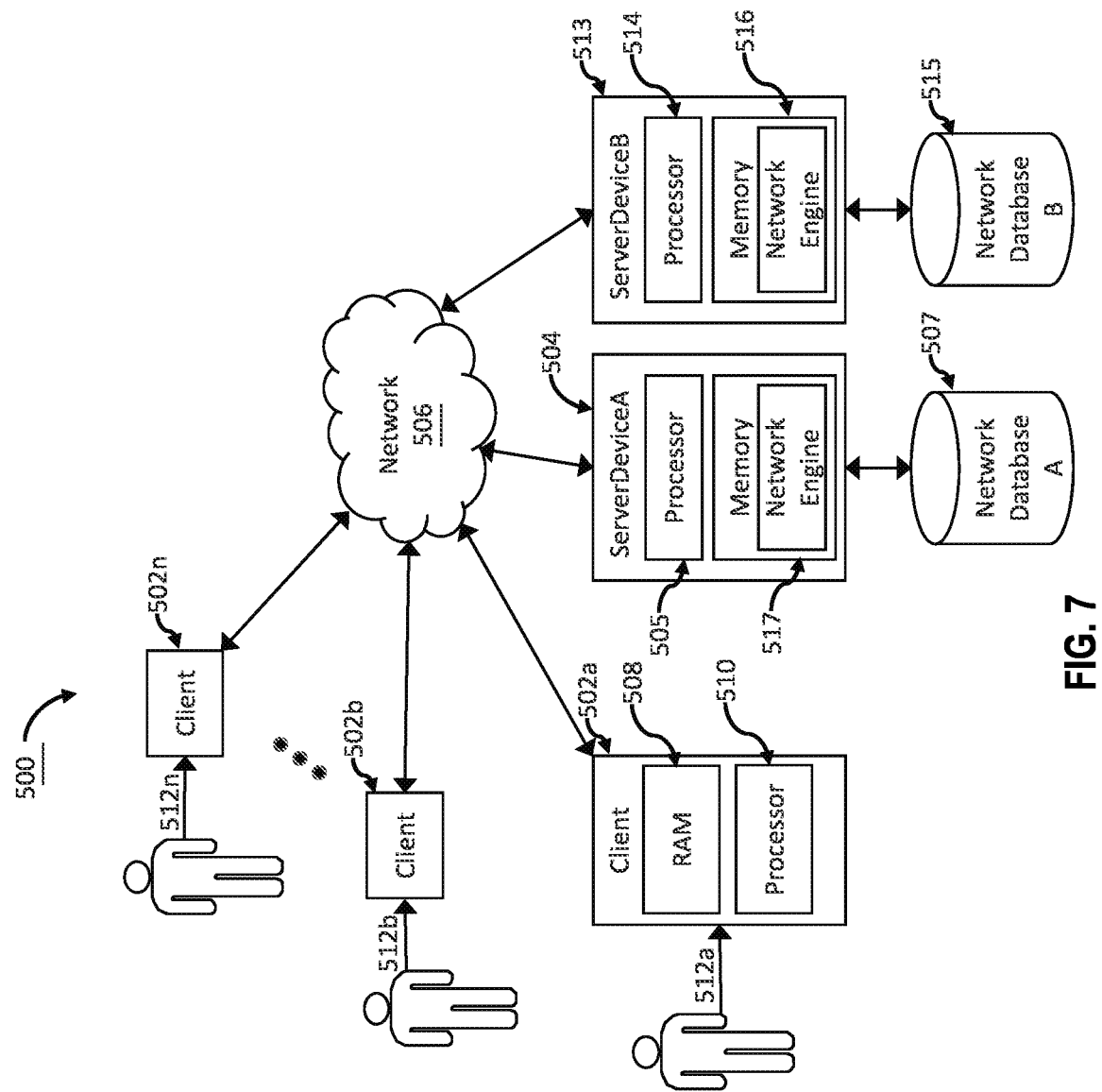
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
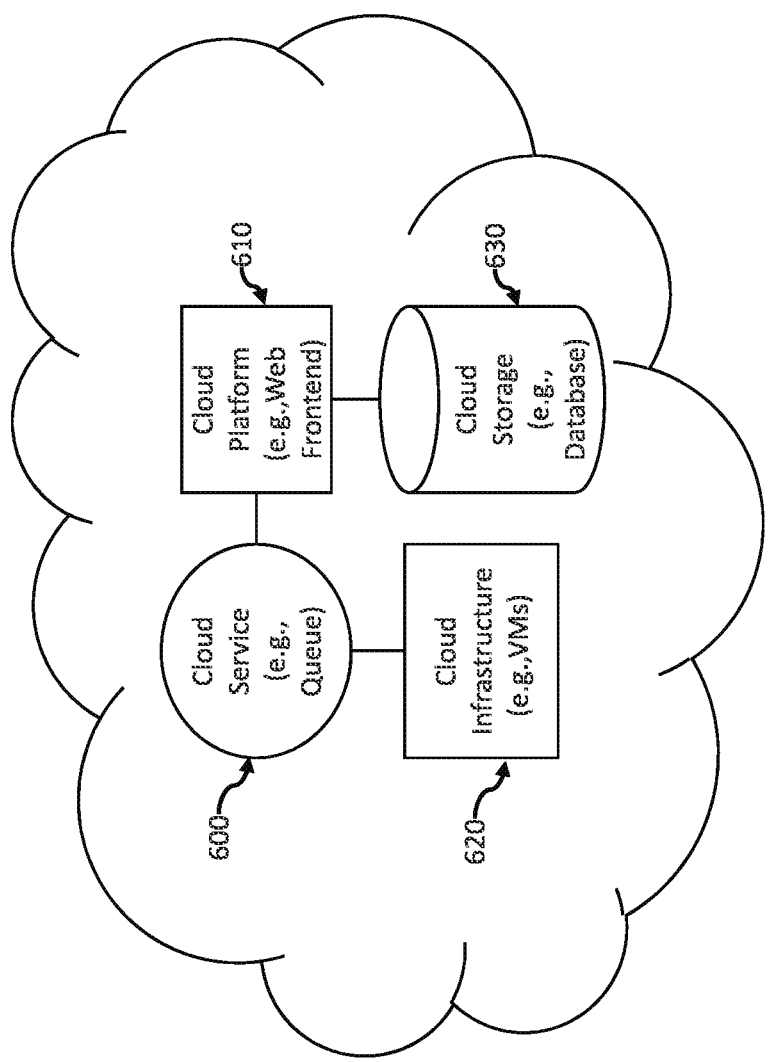
FIGS. 8 and 9 are diagrams illustrating implementations of cloud computing architecture/aspects with respect to which the disclosed technology may be specifically configured to operate, in accordance with one or more embodiments of the present disclosure.
Figure 9:
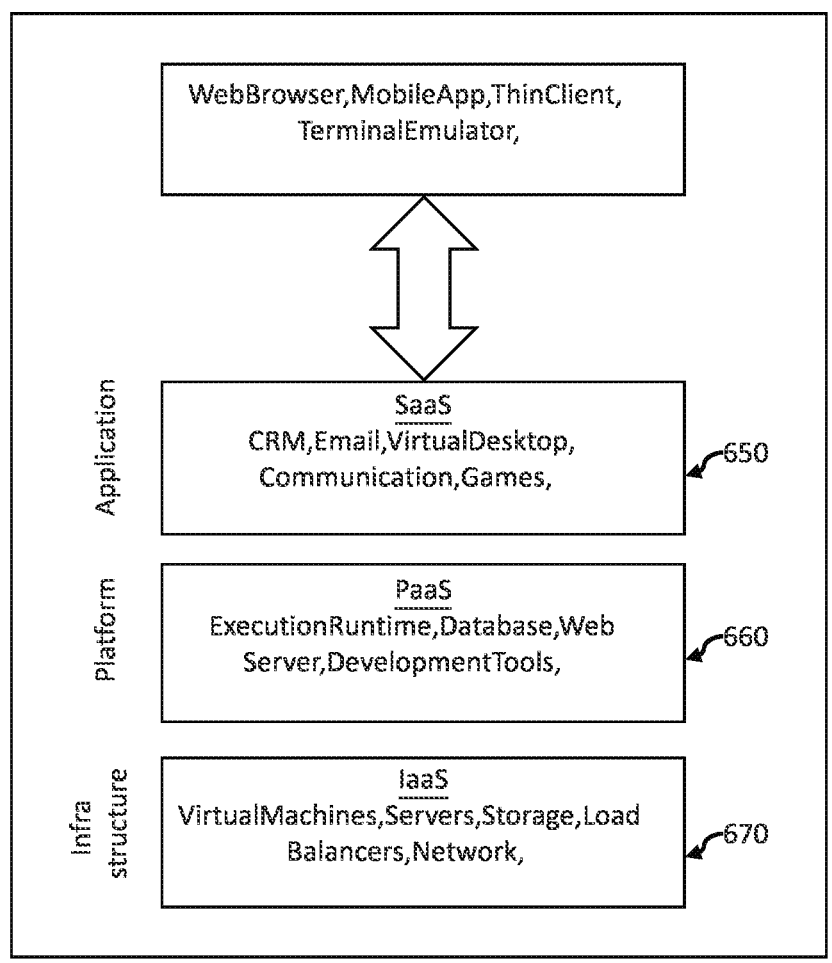

FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. The cloud computing/architecture(s) of FIG. 8 may include, for example, a cloud service 600, a cloud platform 610, a cloud infrastructure 620, and a cloud storage 630.

In some embodiments, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 670, platform as a service (PaaS) 660, and/or software as a service (SaaS) 650 as shown in FIG. 9.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from (e.g., machine learning model 13), but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique associated with, for example, the machine learning model 13 may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
utilizing, by at least one processor, a permission-based access functionality to access over a communication network, a communication software application associated with a first user, a second user, or both;

obtaining, by the at least one processor, over the communication network via the permission-based access functionality, from the communication software application, communication identifying metadata for a plurality of electronic communications associated with the first user, the second user, or both;

processing, by the at least one processor, the communication identifying metadata to generate first physical addresses metadata associated with the plurality of electronic communications;

identifying, by the at least one processor, over the communication network, in a plurality of data objects stored in a plurality of electronic resources, second physical addresses metadata associated with the second user;

storing, by the at least one processor, the first physical addresses metadata and the second physical addresses metadata in a database;

inputting, by the at least one processor, the first physical addresses metadata and the second physical addresses metadata into at least one machine learning model configured to identify a plurality of related physical addresses, based on at least one change in at least one feature of the first physical addresses metadata, the second physical addresses metadata, or both, and to predict a most likely current physical address associated with the second user;

where the at least one feature may include:

occurrence or frequency of addresses in the database, (ii) different address usage types, and (iii) timing or durations information of address usage;

transmitting, by the at least one processor, over the communication network, an instruction to display on a computing device associated with the first user, a first graphical user interface (first GUI) to the first user, the first GUI comprising at least one first GUI element enabling the first user to launch a permission request to the second user, requesting a permission to access a current physical address of the second user;

receiving, by the at least one processor, over the communication network, the permission request;

transmitting, by the at least one processor, over the communication network, in response to the permission request, an instruction to display on a computing device associated with the second user, a second graphical user interface (second GUI) to allow the second user to allow or deny an access to the current physical address of the second user to the first user;

transmitting, by the at least one processor, over the communication network, the permission request to the most likely current physical address associated with the second user;

receiving, by the at least one processor, over the communication network, for the first user, a permission for access to the current physical address of the second user; and automatically updating, by the at least one processor, over the communication network, upon receipt of the permission for access to the current physical address of the second user, a database of physical addresses stored on a computing device associated with the first user with the current physical address of the second user for at least one future communication with the second user.

2. The method according to clause 1, where the inputting may include inputting the first physical addresses metadata, the second physical addresses metadata, or both into the at least one machine learning model further configured to identify potential new physical address information including:

(i) different types of addresses, (ii) addresses having specified duration of time, (iii) marketing-related acquisition of the potential new physical address information, and (iv) a second user's usage of the potential new physical address information.

3. The method as in clauses 1 or 2, further comprising utilizing, by the at least one processor, a browser extension application executed by a computing device associated with the first user, to obtain at least one electronic communication, at least one metadata, at least one potential physical address information, or any combination thereof, of the second user.

4. The method as in clauses 1, 2, or 3, wherein the browser extension application is configured to automatically complete the current physical address, confidentially, into a check-out flow involving need for a shipping address for a good or service, without providing the current physical address in a manner available to others over the communication network.

5. The method as in clauses 1, 2, or 3, wherein the browser extension application is configured to automatically complete the current physical address into a check-out flow involving need for a shipping address for a good or service, upon entry or provision of a name of the second user who will receive the good or service.

6. The method as in clauses 1, 2, 3, 4, or 5, further comprising programming, by the at least one processor, to maintain updated address information of the second user in both an actual address format and a tokenized format;

wherein the tokenized format is configured for one or both of: (i) provision to parties that do not need to know the current physical address of the second user, and (ii) provision to parties that have not been approved by the second user for receipt of the current physical address of the second user.

7. The method as in clauses 1, 2, 3, 4, 5 or 6, further comprising providing, by the at least one processor, a feedback mechanism by which a recipient of the tokenized format may request that the second user approve the recipient of the tokenized format to receive the current physical address of the second user associated with the tokenized format.

8. The method as in clauses 1, 2, 3, 4, 5, 6, or 7, further comprising, providing, by the at least one processor, over the communication network, to at least one computing device associated with at least one approved third party, the current physical address of the second user only to the at least one approved third party involved with a physical shipment or delivery to the second user at the current physical address.

9. The method as in clauses 1, 2, 3, 4, 5, 6, 7 or 8, wherein the plurality of data objects is associated with a plurality of data operations of a business.

10. The method as in clauses 1, 2, 3, 4, 5, 6, 7, 8, or 9, wherein the communication software application is an email application; and wherein the communication identifying metadata is email message metadata.

11. A server may include at least one non-transitory memory and at least one processor. The at least one processor may be configured to execute a code that is stored in the at least one non-transitory memory that causes the at least one processor to:

utilize a permission-based access functionality to access over a communication network, a communication software application associated with a first user, a second user, or both;

obtain, over the communication network via the permission-based access functionality, from the communication software application, communication identifying metadata for a plurality of electronic communications associated with the first user, the second user, or both;

process the communication identifying metadata to generate first physical addresses metadata associated with the plurality of electronic communications;

identify, over the communication network, in a plurality of data objects stored in a plurality of electronic resources, second physical addresses metadata associated with the second user;

store the first physical addresses metadata and the second physical addresses metadata in a database;

input the first physical addresses metadata and the second physical addresses metadata into at least one machine learning model configured to identify a plurality of related physical addresses, based on at least one change in at least one feature of the first physical addresses metadata, the second physical addresses metadata, or both, and to predict a most likely current physical address associated with the second user;

where the at least one feature may include:
(i) occurrence and/or frequency of addresses in the database,
(ii) different address usage types, and
(iii) timing and/or durations information of address usage;

transmit over the communication network, an instruction to display on a computing device associated with the first user, a first graphical user interface (first GUI) to the first user, the first GUI comprising at least one first GUI element enabling the first user to launch a permission request to the second user, requesting a permission to access a current physical address of the second user;

receive over the communication network, the permission request;

transmit over the communication network, in response to the permission request, an instruction to display on a computing device associated with the second user, a second graphical user interface (second GUI) to allow the second user to allow or deny an access to the current physical address of the second user to the first user;

transmit over the communication network, the permission request to the most likely current physical address associated with the second user;

receive over the communication network, for the first user, a permission for access to the current physical address of the second user; and automatically update over the communication network, upon receipt of the permission for access to the current physical address of the second user, a database of physical addresses stored on a computing device associated with the first user with the current physical address of the second user for at least one future communication with the second user.

12. The server according to clause 11, wherein the at least one processor is configured to input the first physical addresses metadata, the second physical addresses metadata, or both into the at least one machine learning model;

wherein the at least one machine learning model is configured to identify potential new physical address information comprising:
(i) different types of addresses,
(ii) addresses having specified duration of time,
(iii) marketing-related acquisition of the potential new physical address information, and
(iv) a second user's usage of the potential new physical address information.

13. The server as in clauses 11 or 12, wherein the at least one processor is further configured to utilize a browser extension application executed by a computing device associated with the first user, to obtain at least one electronic communication, at least one metadata, at least one potential physical address information, or any combination thereof, of the second user.

14. The server as in clauses 11, 12, or 13, wherein the browser extension application is configured to automatically complete the current physical address, confidentially, into a check-out flow involving need for a shipping address for a good or service, without providing the current physical address in a manner available to others over the communication network.

15. The server as in clauses 11, 12, or 13, wherein the browser extension application is configured to automatically complete the current physical address into a check-out flow involving need for a shipping address for a good or service, upon entry or provision of a name of the second user who will receive the good or service.

16. The server as in clauses 11, 12, 13, 14, or 15, wherein the at least one processor is further configured to program to maintain updated address information of the second user in both an actual address format and a tokenized format;

wherein the tokenized format is configured for one or both of: (i) provision to parties that do not need to know the current physical address of the second user, and (ii) provision to parties that have not been approved by the second user for receipt of the current physical address of the second user.

17. The server as in clauses 11, 12, 13, 14, 15 or 16, wherein the at least one processor is further configured to provide a feedback mechanism by which a recipient of the tokenized format may request that the second user approve the recipient of the tokenized format to receive the current physical address of the second user associated with the tokenized format.

18. The server as in clauses 11, 12, 13, 14, 15, 16 or 17, wherein the at least one processor is further configured to provide over the communication network, to at least one computing device associated with at least one approved third party, the current physical address of the second user only to the at least one approved third party involved with a physical shipment or delivery to the second user at the current physical address.

19. The server as in clauses 11, 12, 13, 14, 15, 16, 17 or 18, wherein the plurality of data objects is associated with a plurality of data operations of a business.

20. The server as in clauses 11, 12, 13, 14, 15, 16, 17, 18 or 19, wherein the communication software application is an email application; and wherein the communication identifying metadata is email message metadata.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
receiving, by at least one processor of a server, a permission, through a graphical user interface (GUI) displayed on a plurality of computing devices associated with a plurality of users, from each of the plurality of users, to access a plurality of communication-based data objects associated with at least one application installed on the plurality of computing devices so to monitor, over a communication network, the plurality of computing devices;
accessing, by the at least one processor of the server and via a permission-based access control module, the at least one application to access the plurality of communication-based data objects, for each of the plurality of computing devices associated with each particular user of the plurality of users to allow the server to monitor communication identifying metadata in the plurality of communication-based data objects;
detecting, by the at least one processor of the server and via the permission-based access control module communicating with the at least one application, from the plurality of communication-based data objects, an indication that a first user of the plurality of users needs a physical address of a second user of the plurality of users;
utilizing, by the at least one processor of the server, based on the indication, a physical address metadata extraction software module to detect, from the plurality of communication-based data objects, an initial physical address metadata of the second user;
transmitting, by the at least one processor of the server, over the communication network, automatically in response to detecting the initial physical address metadata of the second user, an API call to remotely program a plurality of electronic resources to:
identify, in a plurality of data objects stored in the plurality of electronic resources, additional physical address metadata associated with the second user, and
transmit the additional physical address metadata associated with the second user to the server;
storing, by the at least one processor of the server, the initial physical address metadata and the additional physical address metadata associated with the second user in a database;
inputting, by the at least one processor of the server, the initial physical address metadata and the additional physical address metadata into at least one machine learning model configured to identify a plurality of related physical addresses, based on at least one change in at least one feature of the initial physical address metadata, the additional physical address metadata, or both, and to predict a most likely current physical address associated with the second user;
wherein the at least one feature comprises:
(i) occurrence or frequency of addresses in the database,
(ii) different address usage types, and
(iii) timing or durations information of address usage;
transmitting, by the at least one processor of the server, over the communication network, an instruction to display on a GUI of a computing device associated with the first user, at least one first GUI element enabling the first user to launch a permission request to the second user, requesting a permission to access a current physical address of the second user;
receiving, by the at least one processor of the server, over the communication network, the permission request;
transmitting, by the at least one processor of the server, over the communication network, in response to the permission request, an instruction to display on a GUI of a computing device associated with the second user, at least one second GUI element to allow the second user to allow or deny an access to the current physical address of the second user to the first user;
transmitting, by the at least one processor of the server, over the communication network, the permission request to the most likely current physical address associated with the second user;
receiving, by the at least one processor of the server, over the communication network, for the first user, a permission for access to the current physical address of the second user; and
automatically updating, by the at least one processor of the server, over the communication network, upon receipt of the permission for access to the current physical address of the second user, a database of physical addresses stored on a computing device associated with the first user with the current physical address of the second user for at least one future communication with the second user.

2. The method according to claim 1, wherein the inputting comprises inputting the initial physical address metadata, the additional physical address metadata, or both into the at least one machine learning model further configured to identify potential new physical address information comprising:
(i) different types of addresses,
(ii) addresses having specified duration of time,
(iii) marketing-related acquisition of the potential new physical address information, and
(iv) a second user's usage of the potential new physical address information.

3. The method according to claim 1, further comprising utilizing, by the at least one processor of the server, a browser extension application executed by a computing device associated with the first user, to obtain at least one electronic communication, at least one metadata, at least one potential physical address information, or any combination thereof, of the second user.

4. The method according to claim 3, wherein the browser extension application is configured to automatically complete the current physical address, confidentially, into a check-out flow involving need for a shipping address for a good or service, without providing the current physical address in a manner available to others over the communication network.

5. The method according to claim 3, wherein the browser extension application is configured to automatically complete the current physical address into a check-out flow involving need for a shipping address for a good or service, upon entry or provision of a name of the second user who will receive the good or service.

6. The method according to claim 1, further comprising programming, by the at least one processor of the server, to maintain updated address information of the second user in both an actual address format and a tokenized format;
wherein the tokenized format is configured for one or both of: (i) provision to parties that do not need to know the current physical address of the second user, and (ii)

provision to parties that have not been approved by the second user for receipt of the current physical address of the second user.

7. The method according to claim 6, further comprising providing, by the at least one processor of the server, a feedback mechanism by which a recipient of the tokenized format may request that the second user approve the recipient of the tokenized format to receive the current physical address of the second user associated with the tokenized format.

8. The method according to claim 1, further comprising, providing, by the at least one processor of the server, over the communication network, to at least one computing device associated with at least one approved third party, the current physical address of the second user only to the at least one approved third party involved with a physical shipment or delivery to the second user at the current physical address.

9. The method according to claim 1, wherein the plurality of data objects is associated with a plurality of data operations of a business.

10. The method according to claim 1, wherein the communication software application is an email application; and wherein the communication identifying metadata is email message metadata.

11. A server, comprising:
  at least one non-transitory memory; and
  at least one processor configured to execute a code that is stored in the at least one non- transitory memory that causes the at least one processor to:
    receive a permission, through a graphical user interface (GUI) displayed on a plurality of computing devices associated with a plurality of users, from each of the plurality of users, to access a plurality of communication-based data objects associated with at least one application installed on the plurality of computing devices so to monitor, over a communication network, the plurality of computing devices;
    access via a permission-based access control module, the at least one application to access the plurality of communication-based data objects, for each of the plurality of computing devices associated with each particular user of the plurality of users to allow the server to monitor communication identifying metadata in the plurality of communication-based data objects;
    detect via the permission-based access control module communicating with the at least one application, from the plurality of communication-based data objects, an indication that a first user of the plurality of users needs a physical address of a second user of the plurality of users;
    utilize, based on the indication, a physical address metadata extraction software module to detect, from the plurality of communication-based data objects, an initial physical address metadata of the second user;
    transmitting over the communication network, automatically in response to detecting the initial physical address metadata of the second user, an API call to remotely program a plurality of electronic resources to:
      identify, in a plurality of data objects stored in the plurality of electronic resources, second additional physical addresses metadata associated with the second user, and
      transmit the additional physical address metadata associated with the second user to the server;
    store the initial physical addresses metadata and the additional physical address metadata associated with the second user in a database;
    input the initial physical address metadata and the additional physical address metadata into at least one machine learning model configured to identify a plurality of related physical addresses, based on at least one change in at least one feature of the initial physical address metadata, the additional physical address metadata, or both, and to predict a most likely current physical address associated with the second user;
    wherein the at least one feature comprises:
      (i) occurrence or frequency of addresses in the database,
      (ii) different address usage types, and
      (iii) timing or durations information of address usage;
    transmit over the communication network, an instruction to display on a GUI of the computing device associated with the first user, at least one first GUI element enabling the first user to launch a permission request to the second user, requesting a permission to access a current physical address of the second user;
    receive over the communication network, the permission request;
    transmit over the communication network, in response to the permission request, an instruction to display on a GUI of a computing device associated with the second user, at least one second GUI element to allow the second user to allow or deny an access to the current physical address of the second user to the first user;
    transmit over the communication network, the permission request to the most likely current physical address associated with the second user;
    receive over the communication network, for the first user, a permission for access to the current physical address of the second user; and
    automatically update over the communication network, upon receipt of the permission for access to the current physical address of the second user, a database of physical addresses stored on a computing device associated with the first user with the current physical address of the second user for at least one future communication with the second user.

12. The server according to claim 11, wherein the at least one processor is configured to input the initial physical address metadata, the additional physical address metadata, or both into the at least one machine learning model;
  wherein the at least one machine learning model is configured to identify potential new physical address information comprising:
    (i) different types of addresses,
    (ii) addresses having specified duration of time,
    (iii) marketing-related acquisition of the potential new physical address information, and
    (iv) a second user's usage of the potential new physical address information.

13. The server according to claim 11, wherein the at least one processor is further configured to utilize a browser extension application executed by a computing device associated with the first user, to obtain at least one electronic communication, at least one metadata, at least one potential physical address information, or any combination thereof, of the second user.

14. The server according to claim 13, wherein the browser extension application is configured to automatically complete the current physical address, confidentially, into a check-out flow involving need for a shipping address for a good or service, without providing the current physical address in a manner available to others over the communication network.

15. The server according to claim 13, wherein the browser extension application is configured to automatically complete the current physical address into a check-out flow involving need for a shipping address for a good or service, upon entry or provision of a name of the second user who will receive the good or service.

16. The server according to claim 11, wherein the at least one processor is further configured to program to maintain updated address information of the second user in both an actual address format and a tokenized format;
wherein the tokenized format is configured for one or both of: (i) provision to parties that do not need to know the current physical address of the second user, and (ii) provision to parties that have not been approved by the second user for receipt of the current physical address of the second user.

17. The server according to claim 16, wherein the at least one processor is further configured to provide a feedback mechanism by which a recipient of the tokenized format may request that the second user approve the recipient of the tokenized format to receive the current physical address of the second user associated with the tokenized format.

18. The server according to claim 11, wherein the at least one processor is further configured to provide over the communication network, to at least one computing device associated with at least one approved third party, the current physical address of the second user only to the at least one approved third party involved with a physical shipment or delivery to the second user at the current physical address.

19. The server according to claim 11, wherein the plurality of data objects is associated with a plurality of data operations of a business.

20. The server according to claim 11, wherein the communication software application is an email application; and wherein the communication identifying metadata is email message metadata.

* * * * *